United States Patent [19]
Johnston et al.

[11] Patent Number: 5,987,431
[45] Date of Patent: Nov. 16, 1999

[54] SELF-SERVICE DEPOSIT METHOD AND APPARATUS

[75] Inventors: Adam J. L. Johnston; Robert D. Andrew, both of Dundee, United Kingdom

[73] Assignee: NCR Corporation, Dayton, Ohio

[21] Appl. No.: 08/950,231

[22] Filed: Oct. 14, 1997

[30] Foreign Application Priority Data

Apr. 9, 1997 [GB] United Kingdom ................... 9707243

[51] Int. Cl.⁶ .................................................. G06F 17/60
[52] U.S. Cl. ................................ 705/35; 902/8; 902/11; 902/12; 902/17; 209/534
[58] Field of Search .................................. 705/42, 35, 43, 705/41; 209/534; 902/8–12

[56] References Cited

U.S. PATENT DOCUMENTS

| | | | |
|---|---|---|---|
| 4,166,945 | 9/1979 | Inoyama et al. | 235/379 |
| 4,602,332 | 7/1986 | Hirose et al. | 705/43 |
| 4,709,820 | 12/1987 | Jenkins et al. | 209/534 |
| 4,964,517 | 10/1990 | Nishiumi et al. | 209/303 |
| 5,105,364 | 4/1992 | Kawamura et al. | 364/478.07 |
| 5,335,484 | 8/1994 | Hain | 53/582 |
| 5,597,996 | 1/1997 | Flood | 235/379 |

FOREIGN PATENT DOCUMENTS

| | | |
|---|---|---|
| 0734001 | 9/1996 | European Pat. Off. . |
| 3243271 | 5/1984 | Germany . |

*Primary Examiner*—James P. Trammell
*Assistant Examiner*—Yehdega Retta
*Attorney, Agent, or Firm*—Gregory A. Welte

[57] ABSTRACT

A self-service deposit terminal (10) for bank notes is arranged to validate the notes. If any notes are deemed invalid then either the invalid notes are diverted from going to a collection means (42) for valid notes, or else the whole deposit is diverted. The diverted notes are bound together, reference details are printed on the bound notes, and the bundle is deposited in a rejection bin (74). The bundle is later compared with the deposit details printed out on a journal printer (72) to identify the user. The total value of the deposit can then be added to the user's account.

16 Claims, 3 Drawing Sheets

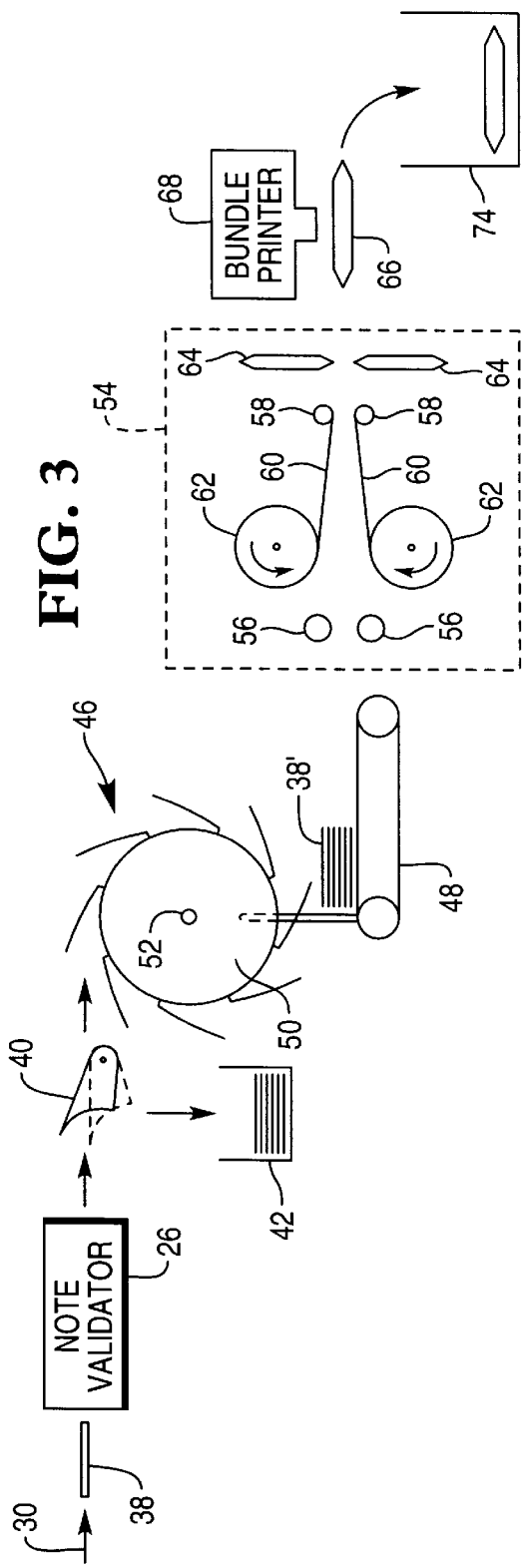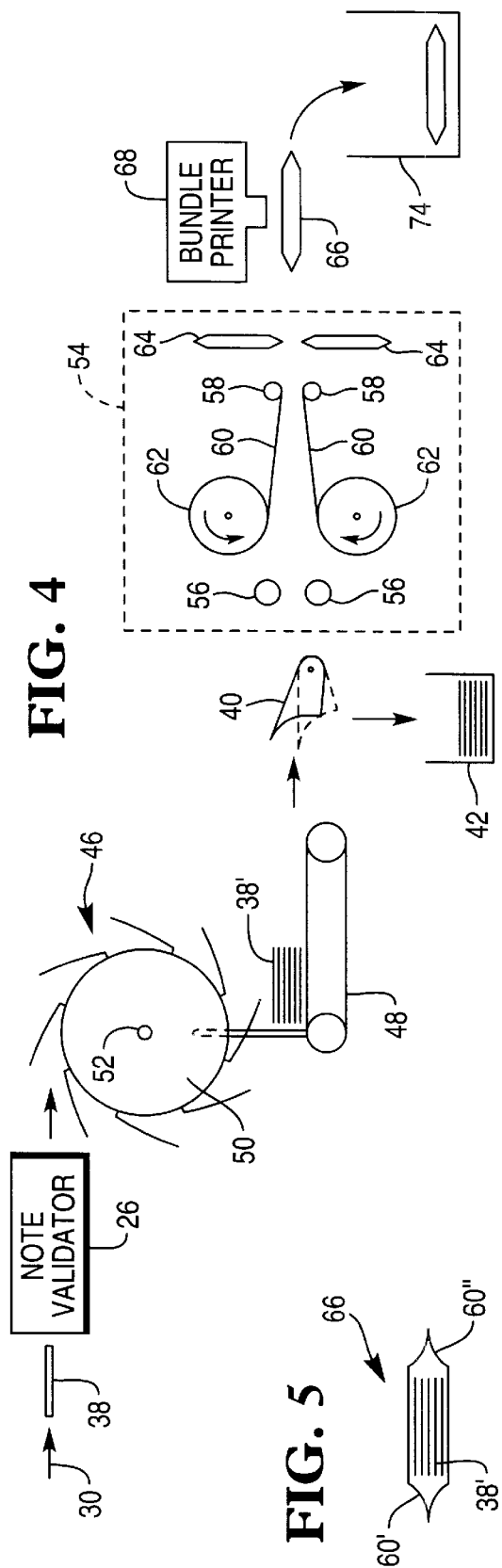

SELF-SERVICE DEPOSIT METHOD AND APPARATUS

BACKGROUND OF THE INVENTION

The present invention relates to a self-service deposit method and apparatus for receiving bank notes or other sheets such as cheques.

A deposit apparatus for receiving bank notes may be included in an automated teller machine (ATM). It is known for an ATM of this type to dispense bank notes which have earlier been deposited at the ATM, such ATM being known as a recycling ATM.

Known self-service deposit terminals for receiving loose bank notes (in contrast with notes contained in envelopes) subject the notes to a validation procedure. One or more of the deposited notes may be rejected on the grounds that they are damaged, dirty or forged, and the rejected notes are returned to the user.

This known type of deposit terminal has the disadvantage that the user must wait at the terminal for possible return of rejected notes, and may spend additional time in retrying to deposit the rejected notes. It is widely accepted that the personal safety of users of self-service deposit terminals is more at risk the longer the time they spend in making a deposit. Apart from the safety issue, the more time spent by users in making deposits the less efficient is the operation of the deposit terminal.

SUMMARY OF THE INVENTION

It is an object of the present invention to provide an improved self-service deposit method and apparatus.

According to one aspect of the present invention there is provided a sheet deposit method including the steps of subjecting sheets to an acceptance procedure, and separating rejected sheets from accepted sheets, characterized by the steps of diverting rejected sheets to retaining means, segregating at least one rejected sheet deposited in any one deposit transaction from rejected sheets deposited in other deposit transactions, and identifying the particular transaction in which a rejected sheet was deposited.

According to another aspect of the present invention there is provided a sheet deposit apparatus including receiving means for receiving at least one sheet deposited by a user in the course of a deposit transaction, and acceptance means arranged to subject deposited sheets to an acceptance procedure and arranged to make a decision as to whether to accept or reject deposited sheets, characterized by separating means for separating rejected sheets from accepted sheets, retaining means for rejected sheets, segregating means for segregating one or more sheets deposited in any one deposit transaction from rejected sheets deposited in other transactions, and identifying means for identifying the particular transaction to which a rejected sheet belongs.

BRIEF DESCRIPTION OF THE DRAWINGS

Two embodiments of the present invention will now be described by way of example with reference to the accompanying drawings, in which:

FIG. 3 is a schematic representation of a first embodiment of a deposit apparatus according to the invention included in the terminal of FIGS. 1 and 2;

FIG. 4 is a schematic representation of a second embodiment of a deposit apparatus according to the invention included in the terminal of FIGS. 1 and 2; and FIG. 5 is a sectional view of a bundle of notes bound by the deposit apparatus of FIGS. 3 and 4.

DETAILED DESCRIPTION

Figure 1:
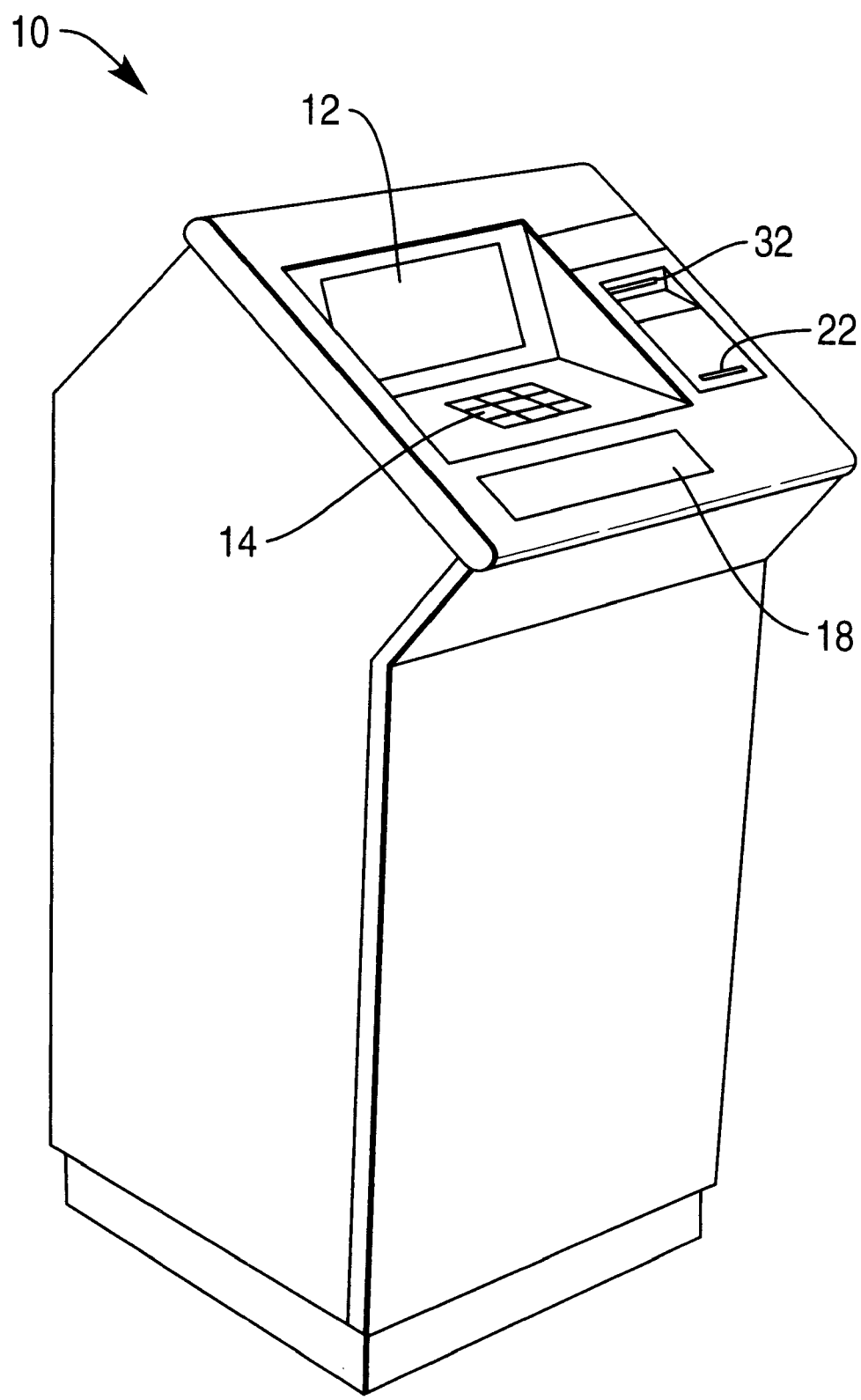
FIG. 1 is a perspective view of a self-service deposit terminal.
Figure 2:
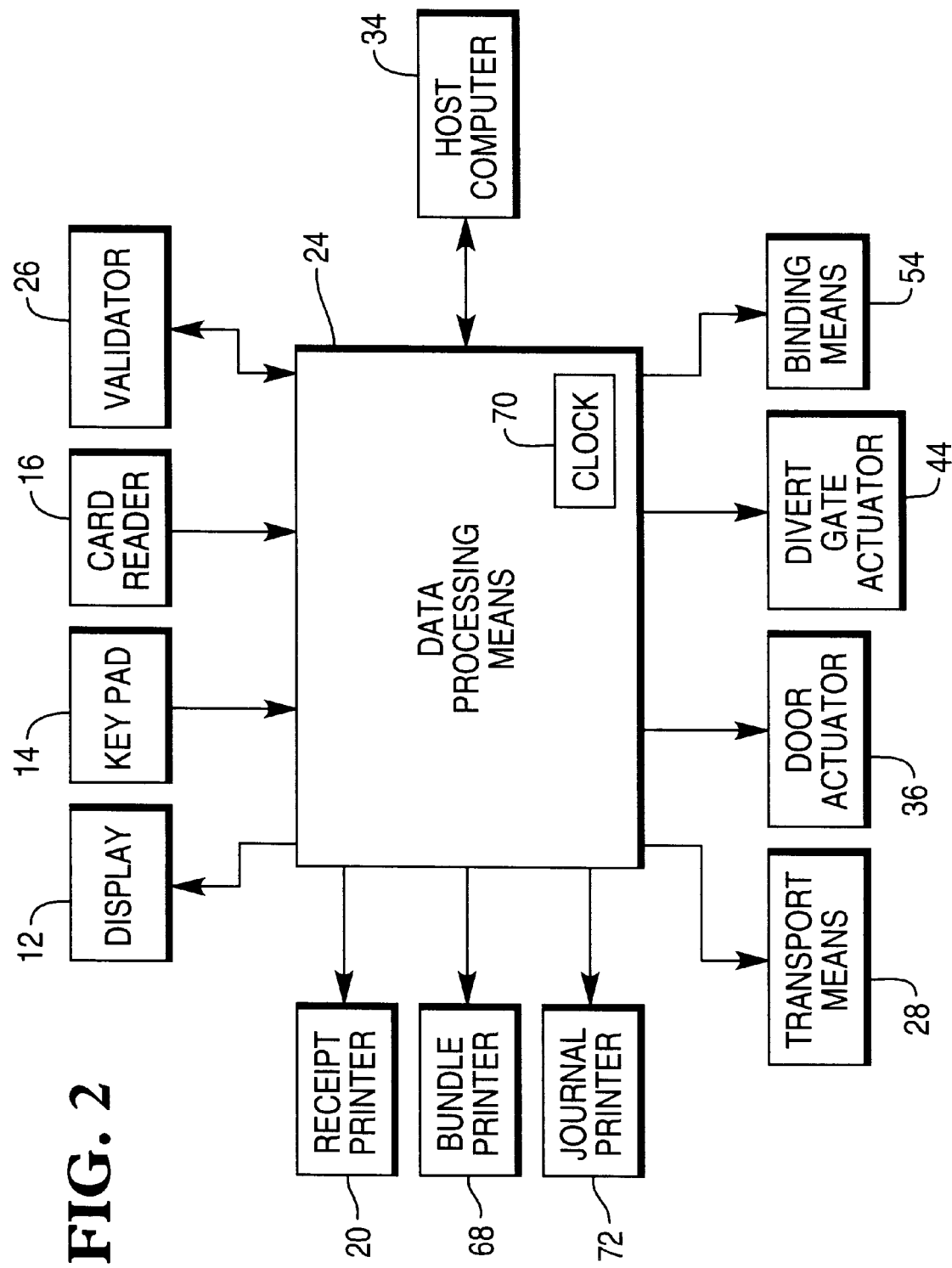
FIG. 2 is a block diagram of the deposit terminal of FIG. 1.

Referring to FIGS. 1 and 2, the self-service deposit terminal 10 shown therein includes a display 12 for displaying user information, a key pad 14 for inputting data, a card reader 16 for receiving a user identity card, a door 18 behind which is a slot in which bank notes can be deposited, a receipt printer 20 for printing a receipt acknowledging a deposit made by a user and for issuing the receipt to the user via a slot 22, and data processing means 24 to which the display 12, the key pad 14, the card reader 16 and the receipt printer 20 are connected. A conventional note validator 26 and note transport means 28 are also connected to the data processing means 24, the transport means 28 serving to transport deposited notes along paths indicated by arrows 30 in FIGS. 3 and 4 under the control of the data processor means 24.

To make a deposit, a user inserts his identification card in the card slot 32 of the terminal 10. Data contained in a magnetic strip on the card is read by the card reader 16 and transmitted by the data processing means 24 to a host computer 34. If the host computer 34 authorizes the card, then the data processing means 24 causes the door 18 to be opened by means of a door actuator 36 so as to allow the user to insert into the deposit slot the note or notes which are to be deposited. Also, the user enters details e.g. amount of the deposit by means of the key pad 14. Once the deposit has been made the door 18 closes.

Referring now to FIG. 3, the deposited notes are separated from each other by conventional separating means (not shown) and individually fed by the transport means 28 (see FIG. 2) to the note validator 26. The note validator 26 makes a determination as to whether each note fed to it, e.g. the note 38 shown in FIG. 3 or FIG. 4, is valid or invalid.

The note validator 26 also recognizes the value of accepted notes of different denominations and the data processing means 24 uses this information to calculate a total value of the accepted notes deposited.

If a note is accepted as valid by the validator 26 then a divert gate 40 remains in its home position shown in solid outline in FIG. 3 and the note is fed to collection means 42.

If a note is rejected as invalid by the validator 26, then the data processing means 24 rotates the divert gate 40 into the position shown in chain outline in FIG. 3 by means of an actuator 44 (see FIG. 2), and the note is fed by transport means to a conventional stacking wheel 46 to be loaded onto belt means 48 that at this time is in a stationary condition. The stacking wheel 46 comprises a plurality of stacking plates 50 spaced apart in parallel relationship along the shaft 52 of the stacking wheel 46.

Once all the notes deposited by the customer have either been fed to the collection means 42 or loaded onto the belt means 48, the data processor means 24 causes the total value of accepted notes deposited to be credited to the user's account identified by the information read off the identification card that had earlier been inserted into the card reader slot 32 (see FIGS. 1 and 2). The receipt printed by the receipt printer 20 includes the total value of the accepted notes deposited.

Any note deposited in a deposit transaction which are rejected by the validator 26 are formed by the stacking wheel 46 into a stack of notes 38' supported on the belt means 48. It should be understood that the stack 38' will comprise only a single note if only one note was rejected in the course of a deposit transaction. The belt means 48 forms part of the transport means 28, which under the control of the data processing means 24 (see FIG. 2), transports the stack of rejected notes to a binding mechanism 54 whose operations is also controlled by the data processing means 24. The stack passes between a pair of guide rolls 56 towards a pair of pressure rolls 58 included in the binding mechanism 54. The pressure rolls 58 are fed with adhesive tape 60, stored on two rolls 62, one located above the path of the stack 38', and the other one below. The adhesive tape 60 fed from each roll 62 has a self-adhesive coating on one side, this coating facing the self-adhesive coating of the tape 60 fed from the other roll 62. The adhesive sticks to itself and not to media such as bank notes. At the pressure rolls 58 the two adhesive tapes 60 adhere together at their free ends. The stack of rejected notes is passed between the pressure rolls 58 and the two tapes 60 causing the notes comprising the stack to be held firmly together between two sections of tape 60. After the trailing edge of the stack 38' has passed between the pressure rolls 58, a pair of cutters 64 included in the binding mechanism 54 cuts the adhering together portions of the tape 60 adjacent the trailing edge of the stack 38' so as to form a discrete bundle 66 as shown in FIG. 5. It will be appreciated that the bundle 66 comprises the stack of notes 38' (which as previously mentioned may be a single note) held between two separate tape portions 60' and 60", the ends of the portion 60' respectively adhering to the ends of the portion 60".

A printer 68, connected to the data processing means 24, prints on the tape portion 60' of the bundle 66 a deposit serial number, and the date and the transaction time. The latter two pieces of information are obtained from a clock 70 built into the data processing means 24. At the same time, the data processing means 24 causes a journal printer 72 (see FIG. 2) to print out the same details along with the card and account number of the user as read from the user's card that was inserted into the card reading slot 32.

After the identifying information is printed on the bundle 66, the bundle 66 is deposited in a rejection bin 74. The binding of the rejected note or notes in a manner described effectively segregates such note or notes from the other notes rejected in the course of the other deposit transactions and held in bundles in the rejection bin 74.

By comparing the information printed on each bound bundle with the journal printout, the financial institution owning the terminal 10 can track down one or more notes rejected in a transaction deposit to a particular user, and can thereby reconcile each deposit transaction.

A rejected note may be a forged note, but more probably is a note that has proved impossible to validate because it is dirty or damaged.

Referring to FIG. 4, a second embodiment is shown. This is similar to the first embodiment shown in FIG. 3 except that the divert gate 40 and collection means 42 are repositioned in relation to the stacking wheel 46 and the belt means 48. Corresponding parts in the embodiments of FIGS. 3 and 4 have the same reference numbers. In operation of the embodiment of FIG. 4, all notes deposited in a deposit transaction are stacked on the belt means 48 regardless of whether or not any of these are rejected. Once the whole deposit has been stacked on the belt means 48, the transport means 28 transports the stack towards the divert gate 40. If no notes were rejected by the validator 26 then the divert gate 40 directs the deposit into the collection means 42. If, however, at least one note is rejected then the whole deposit is directed to the binding mechanism 54 and formed into a bundle as previously described with identifying data being printed on the bundle 66.

In another mode of operation of the embodiment of FIG. 4, if all notes deposited in a deposit transaction are accepted by the validator 26, the data processing means 24 makes a determination as to whether the total value of the deposited notes recognized by the validator 26 is the same as the total value of the deposit as entered by the user via the key pad 14 (see FIG. 1). If the two total values do not correspond, then the user is advised of the discrepancy via the display 12 and asked to re-enter the total value of the deposited notes. If, after a predetermined number of attempts, the user does not enter a total value corresponding to that determined by the data processing means 24, then the deposited stack is fed to the binding mechanism 54 and formed into a bundle and deposited in the rejection bin 74 in the same manner as in the case of one or more of the deposited notes being rejected.

It should be understood that a self-service deposit apparatus in accordance with the invention may be included in a recycling ATM. In this case, collection means in the ATM to which accepted deposited notes are fed includes a plurality of stores where each store holds notes of one particular denomination. The notes are sorted in response to the output from a note validator. If a subsequent user wishes to make a withdrawal from the ATM then notes which have been deposited earlier in the collection means may be retrieved from one or more of the relevant stores and passed to the user in fulfillment of his withdrawal request.

Also, it should be understood that a self-service deposit apparatus in accordance with the invention could be arranged to receive and validate sheets other than bank notes. For example, such apparatus could be used for the reception and validation of cheques or vouchers having a designated value.

What is claimed is:

1. A method of handling sheets, the method comprising the steps of:
    (a) subjecting sheets to an acceptance procedure;
    (b) separating rejected sheets from accepted sheets;
    (c) diverting rejected sheets to a rejection bin;
    (d) segregating at least one rejected sheet deposited in any one deposit transaction from rejected sheets deposited in other deposit transactions; and
    (e) identifying the particular transaction in which a rejected sheet was deposited.

2. A method according to claim 1, further comprising the steps of:
    (f) binding one or more rejected sheets deposited in a single deposit transaction to form a bundle; and
    (g) printing identifying information on the bundle so that the relevant deposit transaction can be identified.

3. A method according to claim 2, wherein step (f) includes the step of:
    (f-1) holding the rejected sheet or sheets between two adhesive tape portions with the ends of one tape portion respectively adhering to the ends of the other tape portion.

4. A method according to claim 3, wherein the identifying information is printed on at least one of the tape portions.

5. A method according to claim 2, further comprising the steps of:
    (h) entering information identifying the user who carries out a deposit transaction, and (i) comparing the printed information on the bundle with the user identifying information to identify the user who deposited the note or notes included in the bundle.

6. A method according to claim 1, wherein step (a) includes the step of:

(a-1) subjecting each deposited sheet to a validation procedure in which a decision is made as to whether the sheet is valid or is invalid.

7. A method according to claim 6, wherein step (b) includes the step of:

(b-1) rejecting only those sheets which are deemed to be invalid.

8. A method according to claim 6, wherein step (b) includes the step of:

(b-1) rejecting all sheets deposited in a deposit transaction if any one sheet deposited in that deposit transaction is deemed to be invalid.

9. A method according to claim 6, further comprising the steps of:

(f) determining the value of each note deemed to be valid;

(g) calculating the total value of the notes deposited in a deposit transaction where all notes are deemed to be valid; and (h) comparing this total value with a value separately entered by a user.

10. A method according to claim 9, wherein step (b) includes the step of:

(b-1) rejecting all the notes deposited in the transaction if the compared values are different.

11. A sheet deposit apparatus comprising:

receiving means for receiving at least one sheet deposited by a user during a deposit transaction;

acceptance means for subjecting deposited sheets to an acceptance procedure and making a decision as to whether to accept or reject deposited sheets;

separating means for separating rejected sheets from accepted sheets;

retaining means for receiving rejected sheets;

segregating means for segregating one or more sheets deposited in any one deposit transaction from rejected sheets deposited in other transactions; and identifying means for identifying the particular transaction to which a rejected sheet belongs.

12. A sheet deposit apparatus according to claim 11, further comprising (i) a card reader for receiving a user's identification card as part of a deposit transaction, (ii) a door covering a sheet deposit slot, and (iii) means for controlling the door to open when the user's identification card is verified and to close when at least one sheet has been deposited during the deposit transaction.

13. In a self-service kiosk, the improvement comprising:

a) means for accepting bank notes from a user;

b) means for classifying the bank notes as type 1 or type 2;

c) means for
   i) separating type 1 notes from type 2 notes,
   ii) bundling type 1 notes into a package,
   iii) placing the package into a first storage location, and
   iv) placing the type 2 notes into a second storage location, without bundling.

14. Improvement according to claim 13, wherein, after bank notes have been accepted from multiple users, i) the first storage location contains a plurality of packages of type 1 bank notes, and ii) the second storage location contains a plurality of separate, non-bundled type 2 bank notes.

15. Improvement according to claim 13, and further comprising means for labeling the bundles with indicia identifying each respective user.

16. Method according to claim 1, wherein, prior to the acceptance procedure, the sheets are delivered by a customer in connection with the transaction.

* * * * *